US006372365B1

(12) United States Patent
Ibuki et al.

(10) Patent No.: US 6,372,365 B1

(45) Date of Patent: Apr. 16, 2002

(54) RESIN-COATED AL-ZN ALLOY COATED STEEL SHEET

(75) Inventors: Masatoshi Ibuki, Nishinomiya; Osamu Goto, Sakai; Noriaki Yoshitake, Okayama; Yoshiyuki Murasawa, Hiroshimashi; Shotaro Tsuda, Okayama, all of (JP)

(73) Assignee: Daido Steel Sheet Corp., Amagasaki (JP)

( * ) Notice: Subject to any disclaimer, the term of this patent is extended or adjusted under 35 U.S.C. 154(b) by 0 days.

(21) Appl. No.: 09/338,598

(22) Filed: Jun. 23, 1999

(30) Foreign Application Priority Data

Jun. 26, 1998 (JP) .......................................... 10-181136

(51) Int. Cl.[7] ............................ B05D 7/14; B32B 15/08

(52) U.S. Cl. ....................... 428/626; 428/653; 428/659; 428/447; 428/450; 428/470

(58) Field of Search ................................ 428/624, 626, 428/653, 659, 447, 450, 470

(56) References Cited

U.S. PATENT DOCUMENTS 6,149,735 A * 11/2000 Oue et al.

FOREIGN PATENT DOCUMENTS

JP 4-2672 1/1992

JP 7-251128 10/1995

* cited by examiner

*Primary Examiner*—Deborah Jones

*Assistant Examiner*—Jason Savage

(74) *Attorney, Agent, or Firm*—Arent Fox Kintner Plotkin & Kahn, PLLC

(57) ABSTRACT

A resin-coated Al—Zn alloy coated steel sheet is excellent in formability, resistance to chromium dissolution, corrosion resistance, alkali resistance, and paintability, and produced by the following method. That is, a silane coupling agent having amino group, chromium ion and at least one alcohol selected from the group consisting of trihydric alcohol and dihydric alcohol having the number of carbon of 2 to 3 are compounded into an acrylic polymer resin emulsion including carboxyl group and glycidyl group, and having an acid value of 10 to 60. A pH of the resultant mixture is adjusted within a range of 7 to 9 to obtain a chromate containing resin composition. The chromate containing resin composition is applied on an Al—Zn alloy coated steel sheet as a substrate, and then dried to obtain a resin film on the substrate. A compounding amount of the silane coupling agent is within a range of 0.5 to 3.0 wt % with respect to a resin solid component of the acrylic polymer resin emulsion. A compounding amount of the alcohol is within a range of 25 to 150 wt % with respect to the chromium ion. An amount of the resin film is within a range of 0.5 to 3.0 $g/m^2$, and a content of chromium ion in the resin film is within a range of 5 to 50 $mg/m^2$.

5 Claims, 1 Drawing Sheet

RESIN-COATED AL-ZN ALLOY COATED STEEL SHEET

TECHNICAL FIELD

The present invention relates to a resin-coated Al—Zn alloy coated steel sheet, which is excellent in formability, resistance to chromium dissolution, corrosion resistance, alkali resistance, and paintability.

BACKGROUND ART

In general, Al—Zn (aluminum-zinc) alloy coated steel sheets can be produced by plating an alloy having a composition of 4 to 75 wt % of Al, small amount of Si (silicon), Mg (magnesium), Ce (cerium)-La (lanthanum) or the like, and the balance of Zn on a steel substrate. As commercially available coated steel sheets, there are two kinds of a low Al—Zn alloy coated steel sheet with an alloy coating layer having a composition of 4 to 10 wt % of Al, small amount of Ce-La and the balance of Zn, and a high Al—Zn alloy coated steel sheet with an alloy coating layer having the composition of 55 wt % of Al, 43.4 wt % of Zn and 1.6 wt % of Si. When a coating thickness of the low Al—Zn alloy coated steel sheet is equal to that of a conventional hot dip galvanized steel sheet, the corrosion resistance of the low Al—Zn alloy coated steel sheet is 1.5 to 2 times as high as that of the hot dip galvanized steel sheet. In addition, when the coating thickness of the high Al—Zn alloy coated steel sheet is equal to that of the conventional hot dip galvanized steel sheet, the corrosion resistance of the high Al—Zn alloy coated steel sheet is 3 to 6 times as high as that of the hot dip galvanized steel sheet. In particular, the high—Al—Zn alloy coated steel sheet exhibits excellent heat resistance and thermal reflectivity.

The composition of the alloy coating layer of this high Al—Zn alloy coated steel sheet is determined to provide good balance between a passivation-film protecting action of Al and a sacrificial anticorrosive action of zinc. In addition, unlike the hot dip galvanized steel sheet, the alloy coating layer has a structure that aluminum-rich phases are surrounded with zinc-rich phases in a network-like manner. Immediately after corrosion begins, a dense, stable compound is generated to fill the network-like space, so that a further progress of corrosion can be prevented. It is believed that excellent corrosion resistance is achieved by this mechanism. Moreover, as described above, since the high Al—Zn alloy coated steel sheet is excellent in the heat resistance and thermal reflectivity, it is becoming pervasive as architectural materials for roof and wall, construction materials for guardrail, soundproofing material, fence for protection from snow and drain ditch, materials for automobile, household electrical appliance and industrial equipment, and a substrate for painted steel sheet.

Although the corrosion resistance of the above described coated steel is excellent, it means that the time that elapses before red rust occurs from corrosion of iron of the steel substrate is long. Therefore, when a passivation is not treated on the coated surface, white rust or black rust will occur in a short time. As a result, a beautiful silver-white appearance of the coated steel sheet will be lost.

For that, a chromate treatment for preventing the occurrence of white rust or black rust, method of coating a resin film by use of a composition containing hexavalent chromium in a water-base resin having an acid value of 10 to 200, which is disclosed in Japanese Patent Publication No. 4-2672, or a treatment of coating a silicone resin containing a lubricating material with a small amount of chromium, which is disclosed in Japanese Patent Early Publication No. 7-251128, have been adopted.

Although the corrosion resistance of the high Al—Zn alloy coated steel sheet can be improved by the chromate treatment, the hardness of the alloy coating layer is too high because of the large Al content, so that there are some problems when forming the coated steel sheet by roll forming or stamping. For example, the alloy coating layer may often receive damages because of poor lubrication between the high Al—Zn alloy coated steel sheet and a roll or a stamping die. Alternatively, when the alloy coating layer is partially melted by friction therebetween, the melted alloy may adhere to the roll or the stamping die. In addition, there is a problem of fine metal particles resulting from the high Al—Zn alloy coated steel sheet during the roll-forming or stamping operation. When the metal particles adhere to corner portions of the rolled or stamped article, a seizing-up phenomenon, scratches or abrasion may occur. These result in a deterioration of the appearance of the formed article.

On the other hand, although the occurrence of bad articles in the roll-forming or stamping operation can be prevented by the surface treatment disclosed in Japanese Patent Publication No. 4-2672, there are another problems described bellow. That is, since the resin film formed by the surface treatment contains hexavalent chromium ion to maintain the corrosion resistance, condensation may occur on the resin-coated Al—Zn alloy coated steel sheet, or a dissolution of the hexavalent chromium ion from the resin film may occur when the resin film is exposed to rain for a long time period. As a result, there is a possibility of causing environmental pollution. In addition, when a contact between the resin film and an alkaline material such as mortar or concrete is kept for a long time period, discoloration to black peculiar to aluminum may be caused on the resin—coated Al—Zn alloy coated steel sheet. Consequently, a deterioration of the appearance of the formed article occurs.

A resin-coated Al—Zn coated steel sheet formed according to the method disclosed in Japanese Patent Early Publication No. 7-251128 exhibits excellent formability because the resin composition used contains a lubricating agent and also good corrosion resistance even after forming. However, when a painting is formed on the resin-coated Al—Zn coated steel sheet, there is a possibility of a poor adhesion between the resin film and the painting because the resin film hardly contain functional group capable of bonding with the painting.

In addition, when the resin-coated Al—Zn alloy coated steel sheet is produced on a high-speed galvanizing line, in which a surface treatment is performed immediately after a hot dip Al—Zn alloy is coated on a steel substrate, a resin composition is applied on the hot dip Al—Zn alloy coated steel sheet in the surface treatment, and then dried at a relatively low temperature of 60 to 120° C. for a short time period, i.e., 3 to 15 seconds. However, when using the resin composition of the prior art, there is a problem that it is difficult to stably provide a high-quality resin film.

Therefore, the present invention is directed to a resin-coated Al—Zn alloy coated steel sheet capable of providing the following advantages:

(1) It is possible to prevent a deterioration of the appearance of the resin-coated Al—Zn alloy coated steel sheet by forming, for example, roll forming or stamping.

(2) Even when a drying operation for the formation of a resin film is performed at a low temperature for a short time period on the conventional high-speed galvanizing line, it is possible to stably provide the resin film having a suitable formability.

(3) Chromium dissolution hardly occurs even when the resin film is exposed to damp air.

(4) The resin-coated Al—Zn alloy coated steel sheet is excellent in corrosion resistance, i.e., resistance to white rust, resistance to black rust, and alkali resistance.

(5) It is possible to provide an improved adhesion between the resin film and a painting formed on the resin film, if necessary.

That is, the resin-coated Al—Zn alloy coated steel sheet of the present invention is composed of an Al—Zn alloy coated steel sheet as a substrate and a resin film formed on the substrate by use of a chromate containing resin composition. The resin-coated Al—Zn alloy coated steel sheet of the present invention is produced according to the following method. That is, (A) a silane coupling agent having amino group, (B) chromium ion, and (C) at least one alcohol selected from the group consisting of trihydric alcohol and dihydric alcohol having the number of carbon of 2 to 3 are compounded into (D) an acrylic polymer resin emulsion including carboxyl group and glycidyl group and having an acid value of 10 to 60. A pH of the resultant mixture is adjusted within a pH range of 7 to 9 to obtain the chromate containing resin composition. After the chromate containing resin composition is applied on the substrate to form an applied film, the applied film is dried to obtain the resin film. In this method, it is essential that a compounding amount of the silane coupling agent (A) is within a range of 0.5 to 3.0 wt % with respect to a resin solid component of the acrylic polymer resin emulsion (D), and a compounding amount of the alcohol (C) is within a range of 25 to 150 wt % with respect to the chromium ion (B). The resin film formed according to the above method is characterized in that an amount of the resin film is within a range of 0.5 to 3.0 $g/m^2$, and a content of the chromium ion (B) in the resin film is within a range of 5 to 50 $mg/m^2$.

In a preferred embodiment of the present invention, a mole ratio of carboxyl group:glycidyl group in the acrylic polymer resin emulsion (D) is 1: 0.3 to 3.0.

In a further preferred embodiment of the present invention, an amount of the chromium ion (B) in the chromate containing resin composition is within a range of 0.5 to 2.0 wt % with respect to the resin solid component of the acrylic polymer resin emulsion (D).

These and still other objects and advantages will become apparent from the following detail description of the preferred embodiments and examples of the invention.

DETAIL DESCRIPTION OF THE INVENTION

Figure 1:
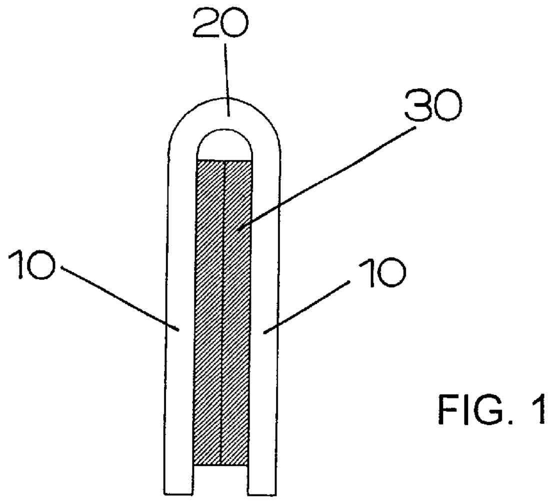
FIG. 1 is a plan view of a test piece for evaluating corrosion resistance of a resin-coated Al—Zn alloy coated steel sheet.

A chromate containing resin composition used in the present invention is obtained by compounding (A) a silane coupling agent having amino group, (B) chromium ion and (C) at least one alcohol selected from the group consisting of trihydric alcohol and dihydric 5 alcohol having the number of carbon of 2 to 3 into (D) an acrylic polymer resin emulsion. A resin film formed by use of the chromate containing resin composition suppresses the occurrence of white rust and black rust in an Al—Zn alloy coated steel sheet to improve the corrosion resistance. In addition, it is possible to obtain improved water resistance, corrosion resistance and alkali resistance of the resin film.

The acrylic polymer resin emulsion (D) including carboxyl group and glycidyl group can be prepared by use of a monomer containing carboxyl group and a monomer containing glycidyl group. As the monomer containing carboxyl group, for example, it is possible to use acrylic acid, methacrylic acid, maleic acid, or itaconic acid. As the monomer containing glycidyl group, for example, it is possible to use acrylic glycidyl or methacrylic glycidyl. A method of preparing the acrylic polymer resin emulsion (D) is not limited to particular one. For example, the resin emulsion can be prepared according to a radical polymerization in the presence of peroxide by use of at least one emulsifier selected from an anionic surfactant such as polyoxyethylene alkyl sodium salt or alkylbenzene sulfonic acid sodium salt, nonionic surfactant such as polyoxyethylene alkylphenyl ether, polyoxyethylene alkyl ester or sorbitan alkyl ester, and a reactive emulsifier having functional group capable of making the radical polymerization with hydrophobic group.

The acrylic polymer resin emulsion (D) used in the present invention has an acid value of 10 to 60. When the acid value is less than 10, adhesion between a resin film formed by use of the chromate containing resin composition and a painting for top coat or finish coat provided on the resin film, if necessary, lowers. On the other hand, when the acid value is more than 60, the alkali resistance of the resin film deteriorates.

In the present invention, it is particularly preferred that a mole ratio of carboxyl group:glycidyl group in the acrylic polymer resin emulsion (D) is 1:0.3 to 3.0. In other words, it is preferred that the acrylic polymer resin emulsion (D) contains 0.3 to 3.0 mol of the glycidyl group relative to 1 mol of the carboxyl group. When satisfying the above mole ratio, the corrosion resistance of the resin film can be further improved. In addition, the chromate containing resin composition is hard to increase the viscosity thereof during handling, and exhibits further improved mechanical stability. When the mole number of the glycidyl group is less than 0.3, there is a possibility that an amount of cross linking in the resin film decreases, so that the corrosion resistance lowers. On the other hand, when the mole number of the glycidyl group is more than 3.0, there is a possibility of lowering the mechanical stability of the chromate containing resin composition. For example, a shearing stress may occur when the chromate containing resin composition is applied on an Al—Zn alloy coated steel sheet by use of a roll coater. In this case, a protective layer of emulsion particles coated with an interfacial active agent is broken, so that an excess amount of cross linking is generated among the emulsion particles. Consequently, a film formation might occur on an application roll, or the viscosity of the chromate containing resin composition might increase in a coater pan. Thus, there is a possibility that it becomes difficult to successively apply the chromate containing resin composition. Therefore, it is preferred to satisfy the above mole ratio of carboxyl group:glycidyl group.

In the present invention, it is important to use the silane coupling agent (A) having amino group to prepare the chromate containing resin composition. A compounding amount of the silane coupling agent (A) is within a range of 0.5 to 3.0 wt % with respect to a resin solid component of the acrylic polymer resin emulsion (D). By satisfying this compounding amount, it is possible to improve the adhesion between the resin film and the painting, and at the same time increase the corrosion resistance and the alkali resistance of the resist film according to a cross-linking reaction between part of amino group in the silane coupling agent (A) and the glycidyl group in the acrylic polymer resin emulsion (D). In addition, adhesion between the resin film and a substrate of a high Al—Zn alloy coated steel sheet is improved by the action of silanol group generated by the hydrolytic degradation of the silane coupling agent. This provides excellent formability of the resin film. By the way, a monohydric alcohol such as methanol or ethanol, which is generated by the hydrolytic degradation of the silane coupling agent, exhibits the action of reducing hexavalent chromium in the chromate containing resin composition to trivalent chromium during a process of forming the resin film by drying the chromate containing resin composition. By this action, resistance to chromium dissolution of the resin film can be improved.

When the compounding amount of the silane coupling agent (A) is less than 0.5 wt %, it is difficult to improve the adhesion between the resin film and various kinds of paints for the painting such as a baking-type melamine alkyd resin (e.g., "DELICON 700" manufactured by Dai Nippon Toryo Co., Ltd., or "ORGA SELECT 100" manufactured by Nippon Paint Co., Ltd.), a cold-setting type acrylic paint (e.g., "TILELAC * EMA" manufactured by Nippon Paint Co., Ltd.), and a cold-setting type urethane paint (e.g., "POLY UREMIGHTYLAC" manufactured by Nippon Paint Co., Ltd.). On the other hand, when the compounding amount is more than 3 wt %, there is a problem that the emulsion stability of the chromate containing resin composition deteriorates. That is, the viscosity of the chromate containing resin composition increases due to excessive cross-linking reaction between the acrylic polymer resin emulsion (D) and the silane coupling agent (A). In some cases, gelation of the chromate containing resin composition occurs. In addition, there are problems that the mechanical stability of the chromate containing resin composition lowers, and trivalent chromium provided by the reduction reaction is excessively bonded with functional group of the silane coupling agent to cause the gelation.

As the silane coupling agent (A) used to prepare the chromate containing resin composition of the present invention, for example, it is possible to use N-β(aminoethyl) γ-aminopropyl methyl diethoxy silane, N-β(aminoethyl)γ-aminopropyl trimethoxy silane, N-β(aminoethyl)γ-aminopropyl triethoxy silane, γ-aminopropyl trimethoxy silane, or γ-aminopropyl triethoxy silane. These compounds are suitable in aqueous solution. In the present invention, it is important that the silane coupling agent (A) has amino group. When using a silane coupling agent having no amino group, for example, a silane coupling agent having vinyl group, methacryloxy group, mercapto group, chloropropyl group or epoxy group without amino group, the reduction reaction of hexavalent chromium rapidly and easily proceeds in the chromate containing resin composition, so that these is a problem that the gelation occurs in a short time. Additionally, in use of most of the silane coupling agents having no amino group, there is a problem of variations in the adhesion between the resin film and the painting.

In the present invention, it is important to use chromium ion (B) to prepare the chromate containing resin composition. As a supplier of the chromium ion, for example, it is possible to use a compound such as ammonium chromate or ammonium dichromate, which does not contain nonvolatile alkali and can be obtained by the neutralization of chromic acid with ammonia. It is preferred that an amount of the chromium ion (B) in the chromate containing resin composition is within a range of 0.5 to 2.0 wt % with respect to the resin solid component in the acrylic polymer resin emulsion (D). In this range, it is possible to further improve the corrosion resistance of the resin film, and suppress an increase in viscosity of the chromate containing resin composition during handling. When the amount of the chromium ion (B) is less than 0.5 wt %, there is a possibility of lowering the corrosion resistance, i.e., a capability of suppressing the occurrence of white rust or black rust by the resin film of the chromate containing resin composition. On the other hand, when the amount of the chromium ion (B) is more than 2.0 wt %, a viscosity of the resin component in the acrylic polymer resin emulsion (D) easily increases, so that there is a possibility that the chromate containing resin composition is hard to obtain as a suitable composition for the subsequent applying step.

In the present invention, it is important to use at least one alcohol (C) selected from the group consisting of trihydric alcohol and dihydric alcohol having the number of carbon of 2 to 3 to prepare the chromate containing resin composition. As the alcohol, for example, it is possible to use ethylene glycol, propylene glycol, trimethylene glycol or glycerin. When using trihydric alcohol or dihydric alcohol having the number of carbon of more than 3, monohydric alcohol, or polyhydric alcohol more than the trihydric alcohol, there is a problem that a speed of the reduction reaction of hexavalent chromium ion to trivalent chromium ion is too slow when the chromate containing resin composition is dried in a short time at a low temperature. As a result, the resistance to chromium dissolution can not be improved. In the present invention, a compounding amount of the alcohol (C) is within a range of 25 to 150 wt % with respect to the chromium ion (B). By satisfying this compounding amount of the alcohol (C), the reduction reaction of hexavalent chromium ion to trivalent chromium ion can be preformed by a sufficient speed even when the chromate containing resin composition is dried in the short time at the low temperature. As a result, it is possible to provide improved resistance to chromium dissolution even under a hostile environment, e.g., damp environments, to the resin film formed by use of the chromate containing resin composition. When the compounding amount of the alcohol (C) is less than 25 wt %, the improvement of the resistance to chromium dissolution is not sufficient. When the compounding amount of the alcohol (C) is more than 150 wt %, the speed of the reduction reaction is too fast, so that there is a problem that the gelation rapidly proceeds.

In succession to the above compounding step, a pH value of the chromate containing resin composition is adjusted within a range of 7 to 9. This pH adjustment is useful to avoid a situation that the reduction reaction of chromium ion in the chromate containing resin composition proceeds at an excessively high speed. Therefore, it is possible to provide the chromate containing resin composition as a resin composition suitable for continuous operation on the conventional galvanizing line. When the pH value is less than 7, there is a problem that the reduction reaction of the chromium ions rapidly proceeds to cause the gelation. This prevents safety operation. On the other hand, when the pH value is more than 9, there are problems that flexibility of the resin film lowers, and lubricating performance of the resin film in the roll-forming or stamping operation becomes poor. To adjust the pH value of the chromate containing resin composition, a volatile alcohol can be used. For example, it is possible to use ammonia, amine such as monoethyl amine, diethyl amine and triethyl amine, or an alkanol amine such as monoethanol amine, diethanol amine and triethanol amine.

After the pH adjustment, the chromate containing resin composition is applied on an Al—Zn alloy coated steel sheet, for example, a 55 % Al—Zn alloy coated steel sheet, and then dried to obtain the resin-coated Al—Zn alloy coated steel sheet of the present invention. Concretely, for example, after oil fouling and dirt are removed from a surface of the Al—Zn alloy coated steel sheet, the chromate containing resin composition can be applied on the surface by use of the conventional applying technique such as dipping, brushing, roll coater, air knife, or electrostatic coating. Then, the applied film of the chromate containing resin composition can be dried by use of a hot-air oven, induction furnace and so on. By this drying step, moisture is removed from the chromate containing resin composition.

In the drying step, when the drying temperature is higher than 400° C., there is a possibility that the resin component of the chromate containing resin composition is burned out. In the practical galvanizing line, the maximum drying temperature would be about 250° C. In addition, the chromate containing resin composition can be dried at a low substrate temperature of 60° C. to 120° C. in a short time of 3 to 15 seconds. Even when adopting such a drying step, the chromate containing resin composition of the present invention can stably provide the resin film having excellent corrosion resistance, chemical resistance, and resistance to chromium dissolution.

In the present invention, the resin film formed by use of the chromate containing resin composition explained above is characterized in that an amount of the resin film is within a range of 0.5 to 3.0 g/m$^2$, and a content of the chromium ion in the resin film is within a range of 5 to 50 mg/m$^2$. When the amount of the resin film is less than 0.5 g/m$^2$, the lubricating performance of the resin film lowers, and the formability of the resin film deteriorates. In addition, the corrosion resistance and alkali resistance of the resin film will become poor. On the other hand, when the amount of the resin film is more than 3.0 g/m$^2$, weldability of the resin film deteriorates. In addition, since there is no hope for further improving the other performance of the resin film by increasing the amount of the resin film, an economical loss will occur. When satisfying the above range for the amount of the resin film, it is possible to provide the resin film exhibiting good lubricating performance in the roll-forming or stamping operation.

In addition, when the content of chromium ion is less than 5 mg/m$^2$, required corrosion resistance of the resin film is not obtained. When the content of chromium ion is more than 50 mg/m$^2$, there is no hope for further improving the corrosion resistance of the resist film. In addition, the excess amount of chromium ion makes a color of the resin film yellow. Therefore, a beautiful appearance (spangle) of the Al—Zn alloy coated sheet will be concealed behind the yellow resin film. This lowers an add value of the resin-coated Al—Zn alloy coated steel sheet. When a painting for top coat or finish coat is not formed on the resin film, it is preferred that the content of chromium ion is within a range of 5 to 30 mg/m$^2$. In this case, discoloration to yellow of the resin film can be prevented with reliability. As a result, it is possible to effectively prevent the deterioration of the appearance of the resin-coated Al—Zn alloy coated steel sheet.

The followings are preferred examples of the present invention. However, the present invention is not limited to these examples.

EXAMPLES

Preparation of Chromate Containing Resin Compositions (No. 1–19)

Chromate containing resin compositions 1–19 were prepared according to the following method.

As a first step, according to compounding amounts listed in Table 1, deionized water and polyoxythylene octylphenyl ether were put in a flask having a volume of 2 liters to obtain a first mixture. The flask is provided with an agitator, reflux condenser, thermometer, and two funnels. The first mixture was heated at a temperature of 80 to 85° C., while being agitated.

As a second step, according to compounding amounts listed in Table 1, butyl acrylate, methyl methacrylate, acrylic acid, glycidyl methacrylate and polyoxyethylene octylphenyl ether were mixed to prepare a monomer mixture. In addition, 8.0 parts by weight of ammonium persulfate and 200.0 parts by weight of deionized water were mixed to prepare a polymerization catalyst solution. The monomer mixture was dropped into the first mixture through one of the funnels. The polymerization catalyst solution was dropped into the first mixture through the other funnel. These dropping operations of the monomer mixture and the polymerization catalyst solution were simultaneously performed over 2 hours to obtain a second mixture.

After the dropping operations, the second mixture was kept at a temperature of 80 to 85° C. for 2 hours to finish the reaction. Then, a pH adjustment of the resultant mixture was performed by use of aqueous ammonia to obtain an acrylic polymer resin emulsion (D) having a concentration of the resin solid component of 42 wt %. As an example, the concentration of the resin solid component can be measured according to the following method. A weight (X g) of an aluminum cup is measured. After the acrylic polymer resin emulsion is put in the aluminum cup, a total weight (Y g) of the aluminum cup with the resin emulsion is measured. The aluminum cup with the resin emulsion is kept at a temperature of 105° C. for 2 hours to remove the moisture from the resin emulsion, and then cooled. After this heat treatment, the total weight (Z g) of the aluminum cup with the dried resin emulsion is measured. The concentration θ (%) of the resin solid component can be calculated by the following equation.

$$\theta\ (\%)=100\times(Z-X)/(Y-X)$$

The acrylic polymer resin emulsion (D) was mixed with a silane coupling agent (A) and an alcohol (C) according to required compounding amounts, as listed in Tables 2 and 3. In addition, a 20% $(NH_4)_2CrO_4$ solution was added to the resultant to obtain a chromate containing resin composition having a concentration of the resin solid component of 35 wt %. In Table 2, the compounding amount of the silane coupling agent (A) is represented by weight percent (wt %) with respect to the resin solid component of the acrylic polymer resin emulsion (D). The amount used of the 20% $(NH_4)_2CrO_4$ solution was determined according to the amount of chromium ion (B), which is represented by weight percent (wt %) with respect to the resin solid component of the acrylic polymer resin emulsion (D), as listed in Table 3. In addition, the compounding amount of the alcohol (C) is represented by weight percent (wt %) with respect to the amount of chromium ion (B). In Table 2, a mole ratio of the acrylic polymer resin emulsion (D) is represented as a ratio of carboxyl group:glycidyl group, i.e., (the mole number of carboxyl group) (the mole number of glycidyl group), in the acrylic polymer resin emulsion. The pH value of the chromate containing resin composition is also listed in Table 3.

Subsequently, this chromate containing resin composition was put in a gastight enclosure, and kept at 40° C. for 24 hours.

Preparation of Resin-coated Al—Zn Alloy Coated Steel Sheets of Examples 1–9 and Comparative Examples 1–17

As a substrate, a steel sheet having 55% Al—Zn alloy coating layers on opposite surfaces thereof was used. An amount of the 55 % Al—Zn alloy coating layer is about 150 $g/m^2$.

As listed in Tables 4 and 5, in each of Examples and Comparative Examples, a required one of the chromate containing resin compositions 1–19 was applied on the Al—Zn alloy coated steel sheet with a predetermined amount by use of a roll coater. Then, the applied film of the chromate containing resin composition was dried in a hot-air oven at an oven temperature of 200° C. for a required drying time to obtain the resin-coated Al—Zn alloy coated steel sheet. The drying time, maximum substrate temperature measured during the drying operation, coating weight of the resin film and a chromium content in the resin film are also shown in Tables 4 and 5.

Evaluation

With respect to the resin-coated Al—Zn alloy coated steel sheet of each of the Examples and Comparative Examples, performance evaluations 1–9 were performed.

1. Resistance to Chromium Dissolution

The resin-coated Al—Zn alloy coated steel sheet was dipped in boiling water for 5 minutes. A ratio (α) of the remaining chromium can be calculated by the following equation:

$$\alpha\ (\%)=(Mb/Ma)\times 100,$$

wherein "Ma" is the chromium content measured before dipping, and "Mb" is the chromium content measured after dipping. In Tables 4 and 5, the symbol "◎" designates that the ratio (α) is 90% or more. The symbol "○" designates that the ratio (α) is 80% or more and less than 90%. The symbol "Δ" designates that the ratio (α) is 60% or more and less than 80%. The symbol "X" designates that the ratio (α) is less than 60%.

2. Alkali Resistance

The resin-coated Al—Zn alloy coated steel sheet was dipped in a 1% NaOH solution at a temperature of 25° C. for 1 hour. Brightness of the resin-coated Al—Zn alloy coated steel sheet was measured before and after dipping by use of a color difference meter. The brightness difference (ΔL) was evaluated according to the following evaluation criteria. In the Tables 4 and 5, the symbol "◎" designates that the brightness difference (ΔL) is less than 5. The symbol "○" designates that the brightness difference (ΔL) is 5 or more and less than 10. The symbol "Δ" designates that the brightness difference (ΔL) is 10 or more and less than 20. The symbol "X" designates that the brightness difference (ΔL) is 20 or more.

3. Corrosion Resistance

The resin-coated Al—Zn alloy coated steel sheet was bent to obtain a test piece according to JIS (Japanese Industrial Standard) G-3312. That is, as shown in FIG. 1, the test piece has flat portions 10 and a bent portion 20. Numeral 30 designates boards each having the same thickness as the resin-coated Al—Zn alloy coated steel sheet, which were put between the flat portions 10. A salt spray test was performed to the flat portions of the test piece for 1000 hours and the bent portion for 200 hours according to JIS Z-2371. A rust generating ratio (β %), which is defined as a ratio of the total area of white rust and black rust generated on the test piece to the entire area, was measured by visual evaluation. In Tables 4 and 5, the symbol "◎" designates that no rust is generated. The symbol "○" designates that the ratio (β %) is less than 10%. The symbol "Δ" designates that the ratio (β %) is 10% or more and less than 30%. The symbol "X" designates that the ratio (β %) is 30% or more.

4. Paintability

Test (1):

A baking-type melamine alkyd paint ("DELICON 700" manufactured by Dai Nippon Toryo Co., Ltd.) was applied on the resin-coated Al—Zn alloy coated steel sheet such that a coating thickness after drying is about 30 μm. Then, a baking treatment was performed at a temperature of 130° C. for 20 minutes to obtain a painting on the resin-coated Al—Zn alloy coated steel sheet.

Test (2):

A cold-setting type acrylic paint ("TILELAC * EMA" manufactured by Nippon Paint Co., Ltd.) was applied on the resin-coated Al—Zn alloy coated steel sheet such that a coating thickness after drying is about 100 μm. Then, the drying treatment was performed at room temperature for 24 hours to obtain a painting on the resin-coated Al—Zn alloy coated steel sheet.

Test (3):

A cold-setting type urethane paint ("POLY URE-MIGHTYLAC" manufactured by Nippon Paint Co., Ltd.) was applied on the resin-coated Al—Zn alloy coated steel sheet such that a coating thickness after drying is about 40 μm. Then, the drying treatment was performed at room temperature for 24 hours to obtain a painting on the resin-coated Al—Zn alloy coated steel sheet.

With respect to each of the paintings, 100 square cuts were formed in the painting to obtain 100 square blocks each having a side of 1 mm. Then, an adhesive tape was put on the 100 square blocks of the painting. After the adhesive tape was peeled off from the painting, the number of the remaining blocks of the painting on the resin-coated Al—Zn alloy coated steel sheet was counted. In the Tables 4 and 5, the symbol "◎"designates that the number of the remaining blocks is 100. The symbol "○" designates that the number of the remaining blocks is within a range of 90 to 99. The symbol "Δ" designates that the number of the remaining blocks is within a range of 80 to 89. The symbol "X" designates that the number of the remaining blocks is less than 80.

5. Rollformability

Figure 2:
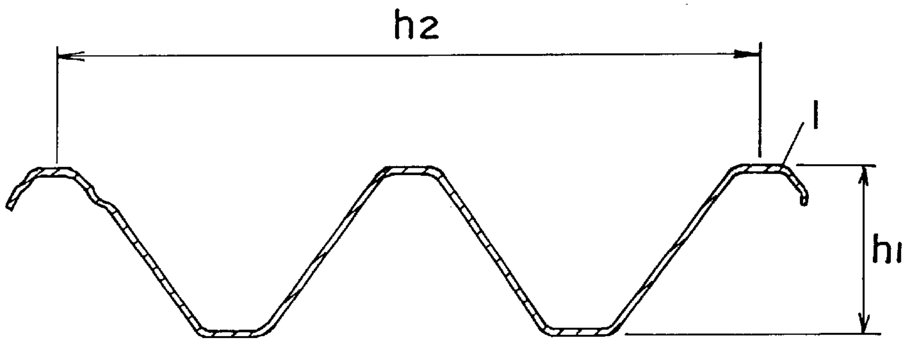
FIG. 2 is a cross-sectional view of a test piece for evaluating formability of the resin-coated Al—Zn alloy coated steel sheet.

A roll forming was performed to a test sheet having a length of 1500 m and made of the resin-coated Al—Zn alloy coated steel of each of Examples and Comparative Examples at a feeding speed of 50 m/min, so that a rolled article 1 having a height (h1) of 130 mm and a width (h2) of 550 mm was obtained, as shown in FIG. 2. After the roll forming, the presence or absence of fine metal particles on the roll used was checked, and also the appearance of the rolled article 1 was checked by visual inspection. Next, another roll forming was performed to a white-painted galvanized steel sheet by use of the same roll to obtain a rolled article. A degree of contamination on the rolled article of the galvanized steel sheet was checked. The rollformability was evaluated according to the following evaluation criteria. In Tables 4 and 5, the symbol "○" designates that there was no fine metal particle adhered on the roll, the appearance of the rolled article 1 was good, and there was no contamination on the rolled article of the galvanized steel sheet. The symbol "Δ" designates that there were some metal particles adhered on the roll, metal marks appeared on the corner portion of the rolled article 1, and there was a slight amount of contamination on the rolled article of the galvanized steel sheet. The symbol "X" designates that the metal particles were baked on the roll, unevenness of a surface treatment agent was observed in addition to the occurrence of the metal marks, and there was a considerable amount of contamination on the rolled article of the galvanized steel sheet.

6. Spot Weldability

A continuous series spot welding test was performed on the resin-coated Al—Zn alloy coated steel sheet under the following condition:

Pressure for Electrode: 200 kgf

Welding Current: 9 kA

Current Passing Time: 12 Hz (0.2 second)

Electrode Shape: Dome-type

A spot welding cycle comprises pressing the electrode against a spot on the resin-coated Al—Zn alloy coated steel sheet under the above condition. The next spot welding cycle was performed on another spot on the resin-coated Al—Zn alloy coated steel sheet. The spot welding cycle was repeated until the current becomes unstable due to a damage of the electrode. The spot weldability was evaluated by the number of spots counted until the spot-welding cycle is stopped. In the Tables 4 and 5, the symbol "◎" designates that the number of spots is 1500 or more. The symbol "○" designates that the number of spots is 1000 or more and less than 1500. The symbol "Δ" designates that the number of spots is 500 or more and less than 1000. The symbol "X" designates that the number of spots is less than 500.

7. Visual Inspection

Whether the beautiful appearance (spangle) of the substrate, i.e., the Al—Zn alloy coated steel sheet, can be observed through the resin film was checked. Hue of the appearance of the resin-coated Al—Zn alloy coated steel sheet was compared with the hue of the substrate. In Tables 4 and 5, the symbol "◎" designates that the beautiful spangle can be clearly observed through the resin film, and the hue of the resin-coated Al—Zn alloy coated steel sheet is substantially the same as that of the substrate. The symbol "○" designates that the beautiful spangle can be observed through the resin film, and the hue of the resin-coated Al—Zn alloy coated steel sheet is slightly yellow as compared with the hue of the substrate. The symbol "Δ" designates that it is difficult to observe the beautiful spangle through the resin film, and the hue of the resin-coated Al—Zn alloy coated steel sheet is yellow as compared with the hue of the substrate. The symbol "X" designates that the beautiful spangle can not be observed through the resin film, and the hue of the resin-coated Al—Zn alloy coated steel sheet is apparent yellow as compared with the hue of the substrate.

8. Emulsion Stability of Chromate Containing Resin Composition

After the chromate containing resin composition used in each of Examples and Comparative Examples was kept at 40° C. for 24 hours, the emulsion stability was evaluated according to the following evaluation criteria. In Tables 4 and 5, the symbol "◎" designates that there was no change in the viscosity of the chromate containing resin composition. The symbol "○" designates that the viscosity of the chromate containing resin composition slightly increased. The symbol "Δ" designates that the viscosity of the chromate containing resin composition increased. The symbol "X" designates the occurrence of gelation.

9. Mechanical Stability of Chromate Containing Resin Composition

Figure 3:
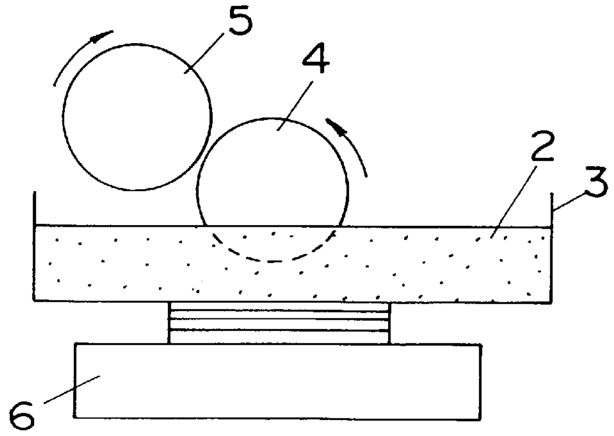
FIG. 3 is a schematic view of an experimental apparatus used to evaluate mechanical stability of a chromate containing resin composition.

The chromate containing resin composition used in each of Examples and Comparative Examples was put in a coater pan 3 for a roll coater, as shown in FIG. 3. After a Cr-plated pickup roll 4 was arranged such that a lower portion of the Cr-plated pickup roll is immersed in the chromate containing resin composition in the coater pan 3, it was rotated in a direction. At the same time, a urethane application roll 5 was arranged adjacent to the Cr-plated pickup roll 4, and rotated in the reverse direction. A rotation speed of the Cr-plated pickup roll 4 is 20 m/min. A rotation speed of the urethane application roll 5 is 1 m/min. A gap between the Cr-plated pickup roll 4 and the urethane application roll 5 was adjusted as narrow as possible. In addition, a heater 6 was arranged under the coater pan 3 to keep the chromate containing resin composition 2 at 40° C. in the coater pan 3.

The above procedure was continued for 2 hours, and then the mechanical stability was evaluated according to the following evaluation criteria. In Tables 4 and 5, the symbol "◎" designates that there was no occurrence of a film-like adherent of the chromate containing resin composition on the respective roll. The symbol "X" designates the occurrence of the film-like adherent of the chromate containing resin composition on the respective roll.

As understood from the results shown in Tables 4 and 5, the resin-coated Al—Zn alloy coated steel sheets of Examples 1 to 9 are excellent in the resistance to chromium dissolution, alkali resistance, corrosion resistance, paintability, rollformability and the weldability, and also provides the beautiful appearance (spangle) of the substrate, i.e., the Al—Zn alloy coated steel sheet through the resin film. In addition, the chromate containing resin compositions used in these Examples are excellent in the emulsion stability and the mechanical stability without causing the gelation.

In particular, since the resin-coated Al—Zn alloy coated steel sheets of Examples 1–6 satisfy the condition that the mole ratio of carboxyl group:glycidyl group in the acrylic polymer resin emulsion is within a range of 1:0.3 to 3.0, they exhibited further improved corrosion resistance as compared with the case of Example 7 using the chromate containing resin composition No. 4 with the mole number of glycidyl group smaller than 0.3. In addition, it is confirmed that the chromate containing resin compositions used in Examples 1–6 provide further improved mechanical stability and emulsion stability than the chromate containing resin composition No. 5 used in Example 8, which has the mole number of glycidyl group larger than 3.0.

In addition, since the resin-coated Al—Zn alloy coated steel sheets of Examples 1–6 satisfy the condition that the amount of the chromium ion in the chromate containing resin composition is within a range of 0.5 to 2.0 wt % with respect to the resin solid component in the acrylic polymer resin emulsion, they exhibited further improved corrosion resistance than the case of Example 9 using the chromate containing resin composition No. 6 with the amount of chromium ion smaller than 0.5 wt %.

The results of Examples 1 and 2 suggest that better performance, i.e., better corrosion resistance at the bent portion, is obtained on Example 1 using the drying temperature of 120° C. than Example 2 using the drying temperature of 60° C.

In Comparative Example 1, since the amount of the resin film is smaller than the defined range in the present invention, i.e., 0.5 to 3.0 g/$m^2$, the alkali resistance, corrosion resistance, and the weldability deteriorated. On the other hand, in Comparative Example 2, the weldability was poor because the amount of the resin film is larger than the defined range in the present invention.

In Comparative Example 3, the corrosion resistance deteriorated because the amount of chromium ion in the resin film is smaller than the defined range in the present invention, i.e., 5 to 50 mg/$m^2$. On the contrary, the appearance of the resin-coated Al—Zn alloy coated steel sheet of Comparative Example 4 deteriorated because the amount of chromium ion in the resin film is larger than the defined range in the present invention.

In Comparative Example 5 using the chromate containing resin composition No. 8, the paintability in the tests (1) and (2) was not sufficient, and the mechanical stability was poor because the acid value of the acrylic polymer resin emulsion is smaller than the defined range in the present invention, 10 to 60. On the contrary, in Comparative Example 6 using the chromate containing resin composition No. 9, the alkali resistance was poor because the acid value of the acrylic polymer resin emulsion is larger than the defined range in the present invention.

In Comparative Example 7 using the chromate containing resin composition No. 10, the gelation of the chromate containing resin composition occurred because a silane coupling agent having no amino group was used. As a result, the resin-coated Al—Zn alloy coated steel sheet of Comparative Example 7 could not be produced, and therefore the above evaluations were not performed.

In Comparative Example 8 using the chromate containing resin composition No. 11, since the silane coupling agent was not compounded, the paintability deteriorated.

In Comparative Example 9 using the chromate containing resin composition No. 12, the paintability in the tests (2) and (3) was not sufficient because the compounding amount of the silane coupling agent is smaller than the defined range in the present invention, i.e., 0.5 to 3.0 wt %. On the other hand, in Comparative Example 10 using the chromate containing resin composition No. 13, the gelation of the chromate containing resin composition occurred because the compounding amount of the silane coupling agent is larger than the defined range in the present invention. As a result, the resin-coated Al—Zn alloy coated steel sheet of Comparative Example 10 could not be produced, and therefore the above evaluations were not performed.

In Comparative Example 11 using the chromate containing resin composition No. 14, the resistance to chromium dissolution and the corrosion resistance were poor because pentaerythritol of a tetravalent alcohol was used as the alcohol.

In Comparative Example 12 using the chromate containing resin composition No. 15, the resistance to chromium dissolution was not sufficient because the compounding amount of the alcohol is smaller than the defined range in the present invention, i.e., 25 to 150 wt %. On the contrary, in Comparative Example 13 using the chromate containing resin composition No. 16, the gelation of the chromium containing resin composition occurred because the compounding amount of the alcohol is larger than the defined range in the present invention. As a result, the resin-coated Al—Zn alloy coated steel sheet of Comparative Example 13 could not be produced, and therefore the above evaluations were not performed.

In Comparative Example 14 using the chromate containing resin composition No. 17, since the pH value of the chromate containing resin composition is smaller than the defined range in the present invention, i.e., 7 to 9, the reduction reaction of chromium ion rapidly proceeded, so that the viscosity of the chromate containing resin composition increased. As a result, the mechanical stability of the chromate containing resin composition was poor. On the contrary, in Comparative Example 15 using the chromate containing resin composition No. 18, the rollformability, alkali resistance and the corrosion resistance were poor because the pH value of the chromate containing resin composition is larger than the defined range in the present invention.

In each of Comparative Examples 16 and 17, the resin film was formed by use of a resin composition containing hexavalent chromium in a water-base resin having an acid value of 10 to 200. Since both of silane coupling agent and alcohol were not compounded to prepare the resin composition, and no glycidyl group was contained in the resin composition, the paintability, corrosion resistance, alkali resistance, and the resistance to chromium dissolution were not sufficient.

TABLE 1

| chromate- | compounding amounts (parts by weight) in 1st step | | compounding amounts (parts by weight) in 2nd step | | | | |
|---|---|---|---|---|---|---|---|
| containing resin composition No. | deionized water | polyoxyethylene octylphenyl ether | butyl acrylate | methyl methacrylate | acrylic acid | glycidyl methacrylate | polyoxyethylene octylphenyl ether |
| 1 | 372.0 | 10 | 184.0 | 185.6 | 15.2 | 15.2 | 10.0 |
| 2 | 372.0 | 10 | 177.0 | 178.0 | 7.6 | 37.4 | 10.0 |
| 3 | 372.0 | 10 | 167.7 | 148.0 | 28.4 | 55.9 | 10.0 |
| 4 | 372.0 | 10 | 193.0 | 197.9 | 7.6 | 1.5 | 10.0 |
| 5 | 372.0 | 10 | 168.0 | 172.2 | 7.6 | 52.2 | 10.0 |
| 6 | 372.0 | 10 | 184.0 | 185.6 | 15.2 | 15.2 | 10.0 |
| 7 | 372.0 | 10 | 184.0 | 185.6 | 15.2 | 15.2 | 10.0 |
| 8 | 372.0 | 10 | 187.0 | 199.0 | 2.4 | 11.8 | 10.0 |
| 9 | 372.0 | 10 | 167.9 | 130.5 | 51.2 | 50.4 | 10.0 |
| 10 | 372.0 | 10 | 167.7 | 148.0 | 28.4 | 55.9 | 10.0 |
| 11 | 372.0 | 10 | 182.5 | 161.1 | 28.4 | 28.0 | 10.0 |
| 12 | 372.0 | 10 | 177.0 | 178.0 | 7.6 | 37.4 | 10.0 |
| 13 | 372.0 | 10 | 177.0 | 178.0 | 7.6 | 37.4 | 10.0 |
| 14 | 372.0 | 10 | 182.5 | 161.1 | 28.4 | 28.0 | 10.0 |
| 15 | 372.0 | 10 | 182.5 | 161.1 | 28.4 | 28.0 | 10.0 |

TABLE 1-continued

| chromate- | compounding amounts (parts by weight) in 1st step | | compounding amounts (parts by weight) in 2nd step | | | | |
|---|---|---|---|---|---|---|---|
| containing resin composition No. | deionized water | polyoxyethylene octylphenyl ether | butyl acrylate | methyl methacrylate | acrylic acid | glycidyl methacrylate | polyoxyethylene octylphenyl ether |
| 16 | 372.0 | 10 | 182.5 | 161.1 | 28.4 | 28.0 | 10.0 |
| 17 | 372.0 | 10 | 167.7 | 148.0 | 28.4 | 55.9 | 10.0 |
| 18 | 372.0 | 10 | 167.7 | 148.0 | 28.4 | 55.9 | 10.0 |
| 19 | 372.0 | 10 | 220.0 | 159.8 | 20.4 | 0 | 10.0 |

TABLE 2

| chromate- | acrylic polymer resin emulsion (D) | | silane coupling agent (A) | |
|---|---|---|---|---|
| containing resin composition No. | mole ratio (*1) | acid value | component | compounding amount (wt %) |
| 1 | 1:0.5 | 30 | γ-aminopropyl trimethoxy silane | 1.0 |
| 2 | 1:2.5 | 15 | γ-aminopropyl triethoxy silane | 2.5 |
| 3 | 1:1.0 | 55 | N-β(aminoethyl)γ-aminopropyl triethoxy silane | 1.5 |
| 4 | 1:0.1 | 15 | N-β(aminoethyl)γ-aminopropyl triethoxy silane | 1.5 |
| 5 | 1:3.5 | 15 | N-β(aminoethyl)γ-aminopropyl triethoxy silane | 1.5 |
| 6 | 1:0.5 | 30 | γ-aminopropyl trimethoxy silane | 1.0 |
| 7 | 1:0.5 | 30 | γ-aminopropyl trimethoxy silane | 1.0 |
| 8 | 1:2.5 | 5 | γ-aminopropyl triethoxy silane | 2.5 |
| 9 | 1:0.5 | 100 | γ-aminopropyl triethoxy silane | 2.5 |
| 10 | 1:1.0 | 55 | γ-glycidoxy propyl trimethoxy silane | 2.5 |
| 11 | 1:0.5 | 55 | not used | |
| 12 | 1:2.5 | 15 | γ-aminopropyl triethoxy silane | 0.3 |
| 13 | 1:2.5 | 15 | γ-aminopropyl triethoxy silane | 3.5 |
| 14 | 1:0.5 | 55 | γ-aminopropyl trimethoxy silane | 1.0 |
| 15 | 1:0.5 | 55 | γ-aminopropyl trimethoxy silane | 1.0 |
| 16 | 1:0.5 | 55 | γ-aminopropyl trimethoxy silane | 1.0 |
| 17 | 1:1.0 | 55 | γ-aminopropyl trimethoxy silane | 2.5 |
| 18 | 1:1.0 | 55 | γ-aminopropyl trimethoxy silane | 2.5 |
| 19 | — | 40 | not used | |

*1 mole ratio = carboxyl group:glycidyl group

TABLE 3

| chromate | chromium ion (B) | | alcohol (C) | | |
|---|---|---|---|---|---|
| containing resin composition No. | compound used to supply chromium ion | amount of chromium ion (wt %) | component | compounding amount (wt %) | pH |
| 1 | $(NH_4)_2CrO_4$ | 1.0 | glycerin | 130 | 8.0 |
| 2 | $(NH_4)_2CrO_4$ | 0.6 | trimethylene glycol | 100 | 7.2 |
| 3 | $(NH_4)_2CrO_4$ | 1.9 | ethylene glycol | 50 | 8.7 |
| 4 | $(NH_4)_2CrO_4$ | 1.5 | ethylene glycol | 50 | 8.6 |
| 5 | $(NH_4)_2CrO_4$ | 1.5 | ethylene glycol | 50 | 8.6 |
| 6 | $(NH_4)_2CrO_4$ | 0.3 | glycerin | 130 | 8.0 |
| 7 | $(NH_4)_2CrO_4$ | 2.5 | glycerin | 130 | 8.0 |
| 8 | $(NH_4)_2CrO_4$ | 0.6 | trimethylene glycol | 100 | 7.2 |
| 9 | $(NH_4)_2CrO_4$ | 0.6 | propylene glycol | 100 | 7.2 |
| 10 | $(NH_4)_2CrO_4$ | 1.0 | ethylene glycol | 50 | 7.5 |
| 11 | $(NH_4)_2CrO_4$ | 1.0 | glycerin | 80 | 7.5 |
| 12 | $(NH_4)_2CrO_4$ | 0.6 | trimethylene glycol | 100 | 7.2 |
| 13 | $(NH_4)_2CrO_4$ | 0.6 | trimethylene glycol | 100 | 7.2 |
| 14 | $(NH_4)_2CrO_4$ | 1.0 | pentaerythritol | 80 | 7.5 |
| 15 | $(NH_4)_2CrO_4$ | 1.0 | glycerin | 20 | 7.5 |
| 16 | $(NH_4)_2CrO_4$ | 1.0 | glycerin | 160 | 7.5 |
| 17 | $(NH_4)_2CrO_4$ | 1.0 | ethylene glycol | 50 | 5.5 |
| 18 | $(NH_4)_2CrO_4$ | 1.0 | ethylene glycol | 50 | 10 |
| 19 | $(NH_4)_2CrO_4$ | 1.0 | not used | 0 | 7.1 |

TABLE 4

| | Example | | | | | | | | | Comparative Example | | | | |
|---|---|---|---|---|---|---|---|---|---|---|---|---|---|---|
| | 1 | 2 | .3 | 4 | 5 | 6 | 7 | 8 | 9 | 1 | 2 | 3 | 4 | 5 |
| chromate-containing resin composition No. | 1 | 1 | 1 | 2 | 3 | 3 | 4 | 5 | 6 | 1 | 2 | 2 | 3 | 8 |
| maximum substrate temperature (° C.) | 120 | 60 | 60 | 80 | 80 | 80 | 80 | 80 | 80 | 60 | 60 | 60 | 60 | 80 |
| drying time (second) | 15 | 5 | 5 | 8 | 8 | 8 | 8 | 8 | 8 | 5 | 5 | 5 | 5 | 8 |
| coating weight ($g/m^2$) | 2.5 | 2.5 | 1.0 | 1.5 | 2.5 | 0.6 | 2.0 | 2.0 | 2.0 | 0.4 | 3.5 | 0.7 | 2.8 | 1.5 |
| chromium content ($mg/m^2$) | 25 | 25 | 10 | 9 | 48 | 11 | 30 | 30 | 6 | 4 | 21 | 4 | 53 | 9 |
| resistance to chromium dissolution | ⊚ | ⊚ | ⊚ | ⊚ | ⊚ | ⊚ | ⊚ | ⊚ | ⊚ | ⊚ | ⊚ | ○ | ⊚ | |
| alkali resistance | ⊚ | ⊚ | ⊚ | ⊚ | ⊚ | ⊚ | ○ | ⊚ | ⊚ | Δ | ⊚ | ○ | ⊚ | ⊚ |
| corrosion resistance flat portion | ⊚ | ⊚ | ⊚ | ⊚ | ⊚ | ⊚ | ○ | ⊚ | ○ | Δ | ⊚ | Δ | ⊚ | ⊚ |
| corrosion resistance bent portion | ⊚ | ○ | ○ | ○ | ⊚ | ○ | ○ | ○ | ○ | x | ⊚ | x | ○ | ○ |
| paintability Test (1) | ⊚ | ⊚ | ⊚ | ⊚ | ⊚ | ⊚ | ⊚ | ⊚ | ⊚ | ⊚ | ⊚ | ⊚ | ⊚ | ⊚ |
| paintability Test (2) | ⊚ | ⊚ | ⊚ | ⊚ | ⊚ | ○ | ⊚ | ⊚ | ⊚ | Δ | ⊚ | ○ | ○ | Δ |
| paintability Test (3) | ⊚ | ⊚ | ⊚ | ⊚ | ⊚ | ⊚ | ⊚ | ⊚ | ⊚ | Δ | ⊚ | Δ | ○ | Δ |
| rollformability | ⊚ | ⊚ | ⊚ | ⊚ | ⊚ | ○ | ⊚ | ⊚ | ⊚ | x | ⊚ | ○ | ⊚ | ⊚ |
| spot weldability | ⊚ | ⊚ | ⊚ | ⊚ | ⊚ | ⊚ | ⊚ | ⊚ | ⊚ | ⊚ | x | ⊚ | ○ | ⊚ |
| visual inspection | ⊚ | ⊚ | ⊚ | ⊚ | ⊚ | ⊚ | ⊚ | ⊚ | ⊚ | ⊚ | ⊚ | ⊚ | x | ⊚ |
| mechanical stability | ⊚ | ⊚ | ⊚ | ⊚ | ⊚ | ⊚ | ⊚ | ○ | ⊚ | ⊚ | ⊚ | ⊚ | ⊚ | x |
| emulsion stability | ⊚ | ⊚ | ⊚ | ⊚ | ⊚ | ⊚ | ⊚ | ○ | ⊚ | ⊚ | ⊚ | ⊚ | ⊚ | ⊚ |

TABLE 5

| | Comparative Example | | | | | | | | | | | |
|---|---|---|---|---|---|---|---|---|---|---|---|---|
| | 6 | 7 | 8 | 9 | 10 | 11 | 12 | 13 | 14 | 15 | 16 | 17 |
| chromate-containing resin composition No. | 9 | 10 | 11 | 12 | 13 | 14 | 15 | 16 | 17 | 18 | 19 | 19 |
| maximum substrate temperature (° C.) | 80 | 80 | 80 | 80 | 80 | 80 | 80 | 80 | 80 | 80 | 120 | 60 |
| drying time (second) | 8 | 8 | 8 | 8 | 8 | 8 | 8 | 8 | 8 | 8 | 15 | 5 |
| coating weight ($g/m^2$) | 2.0 | — | 1.5 | 1.5 | — | 1.0 | 1.0 | — | 1.0 | 1.5 | 2.5 | 2.5 |
| chromium content ($mg/m^2$) | 12 | — | 15 | 9 | — | 10 | 10 | — | 10 | 15 | 25 | 25 |
| resistance to chromium dissolution | ⊚ | — | ⊚ | ○ | — | x | Δ | — | ⊚ | ⊚ | ○ | x |
| alkali resistance | x | — | Δ | ○ | — | ⊚ | ⊚ | — | ⊚ | Δ | Δ | x |
| corrosion resistance flat portion | ⊚ | — | Δ | ○ | — | ○ | ○ | — | ⊚ | ○ | ○ | Δ |
| corrosion resistance bent portion | ○ | — | x | Δ | — | x | Δ | — | ○ | x | Δ | x |
| paintability Test (1) | ⊚ | — | Δ | ○ | — | ⊚ | ⊚ | — | ⊚ | ⊚ | ○ | ○ |
| paintability Test (2) | ⊚ | — | x | Δ | — | ⊚ | ⊚ | — | ⊚ | ⊚ | Δ | x |
| paintability Test (3) | ⊚ | — | x | x | — | ⊚ | ⊚ | — | ⊚ | ⊚ | x | x |
| rollformability | ⊚ | — | ⊚ | ⊚ | — | ⊚ | ⊚ | — | ⊚ | x | ⊚ | ⊚ |
| spot weldability | ⊚ | — | ⊚ | ⊚ | — | ⊚ | ⊚ | — | ⊚ | ⊚ | ⊚ | ⊚ |
| visual inspection | ⊚ | — | ⊚ | ⊚ | — | ⊚ | ⊚ | — | ⊚ | ⊚ | ⊚ | ⊚ |
| mechanical stability | ⊚ | — | ⊚ | ⊚ | — | ⊚ | ⊚ | — | x | ⊚ | ⊚ | ⊚ |
| emulsion stability | ⊚ | x | ⊚ | ⊚ | x | ⊚ | ⊚ | x | Δ | ⊚ | ⊚ | ⊚ |

What is claimed is:

1. A resin-coated Al—Zn alloy coated steel sheet, which is composed of an Al—Zn alloy coated steel sheet as a substrate and a resin film formed on said substrate by use of a chromate containing resin composition, and produced by the steps of:

compounding (A) a silane coupling agent having amino group, (B) chromium ion, and (C) at least one alcohol selected from the group consisting of trihydric alcohol and dihydric alcohol having a carbon number of 2 to 3 into (D) an acrylic polymer resin emulsion including carboxyl group and glycidyl group and having an acid value of 10 to 60;

adjusting a pH of the resultant mixture within a pH range of 7 to 9 to obtain said chromate containing resin composition;

applying said chromate containing resin composition on said substrate to form an applied film; and drying said applied film to obtain said resin film, wherein a compounding amount of said silane coupling agent (A) is within a range of 0.5 to 3.0 wt % with respect to a resin solid component of said acrylic polymer resin emulsion (D), a compounding amount of said alcohol (C) is within a range of 25 to 150 wt % with respect to the chromium ion, the weight of said resin film is within a range of 0.5 to 3.0 $g/m^2$, and the content of the chromium ion (B) in said resin film is within a range of 5 to 50 $mg/m^2$.

2. The resin-coated Al—Zn alloy coated steel sheet as set forth in claim 1, wherein a mole ratio of carboxyl group:glycidyl group in said acrylic polymer resin emulsion (D) is 1: 0.3 to 3.0.

3. The resin-coated Al—Zn alloy coated steel sheet as set forth in claim 1, wherein the content of the chromium ion (B) in said chromate containing resin composition is within a range of 0.5 to 2.0 wt % with respect to a resin solid component of said acrylic polymer resin emulsion (D).

4. The resin-coated Al—Zn alloy coated steel sheet as set forth in claim 2, wherein the content of the chromium ion (B) in said chromate containing resin composition is within a range of 0.5 to 2.0 % with respect to a resin solid component of said acrylic polymer resin emulsion (D).

5. The resin-coated Al—Zn alloy coated steel sheet as set forth in claim 1, wherein said resin film contains trivalent chromium formed by reducing hexavalent chromium.

* * * * *